United States Patent
Engesser et al.

(10) Patent No.: US 8,240,917 B2
(45) Date of Patent: Aug. 14, 2012

(54) FLUID DYNAMIC BEARING PATTERN AND FLUID DYNAMIC BEARING

(75) Inventors: Martin Engesser, Donaueschingen (DE); Stefan Schwamberger, Hermsdorf (DE)

(73) Assignee: Minebea Co., Ltd., Nagano-Ken (JP)

( * ) Notice: Subject to any disclaimer, the term of this patent is extended or adjusted under 35 U.S.C. 154(b) by 750 days.

(21) Appl. No.: 12/231,931

(22) Filed: Sep. 8, 2008

(65) Prior Publication Data
US 2009/0074336 A1 Mar. 19, 2009

(30) Foreign Application Priority Data
Sep. 13, 2007 (DE) .......... 10 2007 043 575

(51) Int. Cl.
*F16C 32/06* (2006.01)
(52) U.S. Cl. .......... 384/100; 384/112; 384/123
(58) Field of Classification Search .......... 384/100, 384/107, 112, 114, 123
See application file for complete search history.

(56) References Cited

U.S. PATENT DOCUMENTS

| | | | |
|---|---|---|---|
| 3,746,407 A | 7/1973 | Stiles | |
| 6,350,059 B1 * | 2/2002 | Takahashi | 384/123 |
| 7,090,401 B2 | 8/2006 | Rahman | |
| 2004/0184688 A1 * | 9/2004 | Le et al. | 384/107 |
| 2006/0192451 A1 | 8/2006 | Hong | |
| 2007/0290559 A1 * | 12/2007 | Hendriks et al. | 310/90 |
| 2007/0292058 A1 * | 12/2007 | Hendriks et al. | 384/100 |
| 2008/0168654 A1 * | 7/2008 | Hou | 29/898.02 |

FOREIGN PATENT DOCUMENTS

| | | | |
|---|---|---|---|
| DE | 29521034 | | 9/1996 |
| GB | 1590596 | | 6/1981 |
| GB | 2237849 | | 5/1991 |
| JP | 63285320 | | 11/1988 |
| JP | 7269560 | | 10/1995 |
| JP | 09035404 | A * | 2/1997 |
| JP | 10318250 | A * | 12/1998 |
| WO | 2005046027 | | 5/2005 |

* cited by examiner

*Primary Examiner* — Thomas R Hannon
*Assistant Examiner* — Phillip A Johnson
(74) *Attorney, Agent, or Firm* — Cooper & Dunham LLP

(57) ABSTRACT

The invention relates to a fluid dynamic bearing pattern that is disposed on at least one bearing surface of the two bearing parts of a fluid dynamic bearing that are moveable with respect to each other along a direction of movement. The bearing pattern comprises two related grooved sections, each section extending at an acute angle with respect to the direction of movement and exerting a defined pumping effect on the bearing fluid found in the bearing when the bearing parts move with respect to each other. According to the invention, the first section is disposed at an angle $\alpha$ and the second section at an angle $\beta$ with respect to the direction of movement, the two angles varying in size.

16 Claims, 3 Drawing Sheets

FLUID DYNAMIC BEARING PATTERN AND FLUID DYNAMIC BEARING

BACKGROUND OF THE INVENTION

The invention relates to a fluid dynamic bearing pattern according to the characteristics of claim 1, particularly a bearing pattern for a fluid dynamic bearing that comprises one or more axial bearings and/or radial bearings. These kinds of fluid dynamic bearings are used, for example, for the rotational support of fan motors or spindle motors for driving hard disk drives.

PRIOR ART

Fluid dynamic bearings generally comprise at least two bearing parts that are rotatable with respect to one another and that form a bearing gap filled with a bearing fluid, such as air or bearing oil, between associated bearing surfaces. Bearing patterns that are associated with the bearing surfaces and that act on the bearing fluid are provided using a well-known method. In fluid dynamic bearings, the bearing patterns taking the form of depressions or raised areas are usually formed on one or on both bearing surfaces. These bearing patterns formed on the appropriate bearing surfaces of the bearing partners act as pumping patterns that exert a pumping effect on the bearing fluid when the bearing parts rotate with respect to each other and generate hydrodynamic pressure in the bearing gap. In the case of radial bearings, sinusoidal, parabolic or herringbone patterns, for example, are used that are distributed perpendicular to the rotational axis of the bearing parts over the circumference of at least one bearing part. For axial bearings, herringbone patterned or spiral-shaped bearing patterns are known.

In practice, it has often proved desirable to have a defined pumping direction and pumping intensity of the axial or radial bearings. As can be seen from FIG. 2, this can be achieved by asymmetric bearing patterns 50 that are subdivided into two or more sections 52, 54. The two sections 52, 54 are disposed at symmetric angles with respect to an apex line 56 and meet at an acute angle. Each section 52, 54 encloses an angle $\alpha$ with the direction of movement 58 in which the bearing parts move with respect to each other. The bearing pattern 50 extends over the width D of a bearing surface, the two sections 52, 54 in the illustrated example varying in length and section 52 taking up width d1* of the overall width D and section 54 taking up width d2* of the overall width D. Each section 52, 54 generates a defined pumping intensity and pumping direction. The longer section 52 of the bearing pattern 50 generates a greater pumping effect than the short section 54, the pumping directions of the two sections 52, 54 being directed in opposite directions.

The optimal design of the bearing patterns of fluid dynamic radial bearings and axial bearings is known in general terms. For example, the optimal angle $\alpha$ of the bearing patterns is between 20° and 30°. The optimal groove depth is approximately 1.5 times the bearing gap width. For sinusoidal grooves, the angle measured is that enclosed between the direction of movement and the tangent at the endpoint of the shorter groove.

These optimized bearing patterns generate an optimal stiffness/friction torque factor and great pressure. If the available bearing surface, particularly width D of the bearing surface, is very small, smaller, for example, than 1 mm, it is very difficult, in terms of production engineering, to form the bearing patterns so that they are able to achieve the desired pumping directions and pressures. The available width d2* for the shorter section 54 of the bearing pattern 50 is often too small to allow the required tolerances to be reliably met during manufacture.

SUMMARY OF THE INVENTION

It is thus the object of the invention to improve the design of the pressure generating bearing patterns in a fluid dynamic bearing so as to reduce the negative effects acting on the pumping action and the pumping direction brought about by the manufacturing tolerances of the bearing patterns.

This object has been achieved according to the invention by a fluid dynamic bearing pattern in accordance with the characteristics of patent claim 1. A fluid dynamic bearing having bearing patterns according to the invention is cited in claim 15.

Preferred embodiments and further advantageous characteristics of the invention are cited in the subordinate claims.

The fluid dynamic bearing pattern is disposed on at least one bearing surface of the two bearing parts of a fluid dynamic bearing that are moveable with respect to each other along a direction of movement. The bearing pattern comprises two related grooved sections, each section extending at an acute angle to the direction of movement and exerting a defined pumping effect on the bearing fluid found in the bearing when the bearing parts move with respect to each other. According to the invention, the bearing pattern is characterized in that the first section of the bearing pattern is disposed at an angle $\alpha$ and the second section at an angle $\beta$ to the direction of movement, where angles $\alpha$ and $\beta$ differ from each other. To date it was known to dispose both sections at the same angle with respect to the direction of movement. Now that different angles are provided, it is possible to define the pumping effect of the individual sections by varying both the angle as well as the length of the sections, and also to optimize the angle and the length so as to reduce the influence of manufacturing tolerances on the pumping effect.

The bearing pattern according to the invention is designed to be asymmetric, not only with respect to the angles $\alpha$ and $\beta$ of the two sections, but also asymmetric with respect to the length of the sections as well as other parameters of the sections, as described below.

The pumping effect of the sections, in particular, is changed for the worse by the different angles and lengths compared to the optimally calculated values, at the same time, however, the acceptable tolerances increase, thus lessening the influence of manufacturing precision.

The ratio of the two angles $\alpha/\beta$ is preferably less than or equal to 3/4. A favorable ratio for the two angles $\alpha/\beta$ has proven in practice to be, for example, 1/3.

According to one aspect of the invention, the two linear sections of the bearing pattern are connected to one another at one point and merge into each other. However, the sections need not be connected to one another but may adjoin each other at a short distance, it also being possible for the sections to be disposed at an offset to one another with respect to the direction of movement.

The two sections preferably form an angle $\alpha+\beta$ of 0° to 180°, preferably an angle of 20° to 160°.

The design of the linear sections of the bearing pattern can be varied. At least one or both sections can be formed, for example, as a straight line. It can, however, also be provided for at least one of the sections to be formed as a curve. If both sections are formed as a curve, the curvatures of the curves may vary from each other. The curves could take, for example, a sinusoidal, exponential, parabolic or hyperbolic course. As described above, not only can the angles $\alpha$ and $\beta$ differ with respect to the direction of movement of the two sections, but the two sections may also have a different length. Due to the different lengths and angles as well as the different orientation with respect to the direction of movement, the two sections generate a pumping effect in two different directions.

Moreover, the groove depth of the sections may be different, as well as the groove width, which presents another possibility of influencing the intensity of the pumping effect.

The invention further relates to a fluid dynamic bearing having at least two bearing parts that are moveable with respect to each other along a direction of movement and that form a bearing gap filled with bearing fluid between associated bearing surfaces, where a plurality of bearing patterns according to the invention are disposed on at least one bearing surface.

This kind of fluid dynamic bearing can be used for the rotatable support of spindle motors, the bearing parts of the bearing system being directly or indirectly driven in rotation by an electromagnetic drive system.

The invention will now be described in more detail on the basis of preferred embodiments with reference to the drawings described below.

DESCRIPTION OF PREFERRED
EMBODIMENTS OF THE INVENTION

Figure 1:
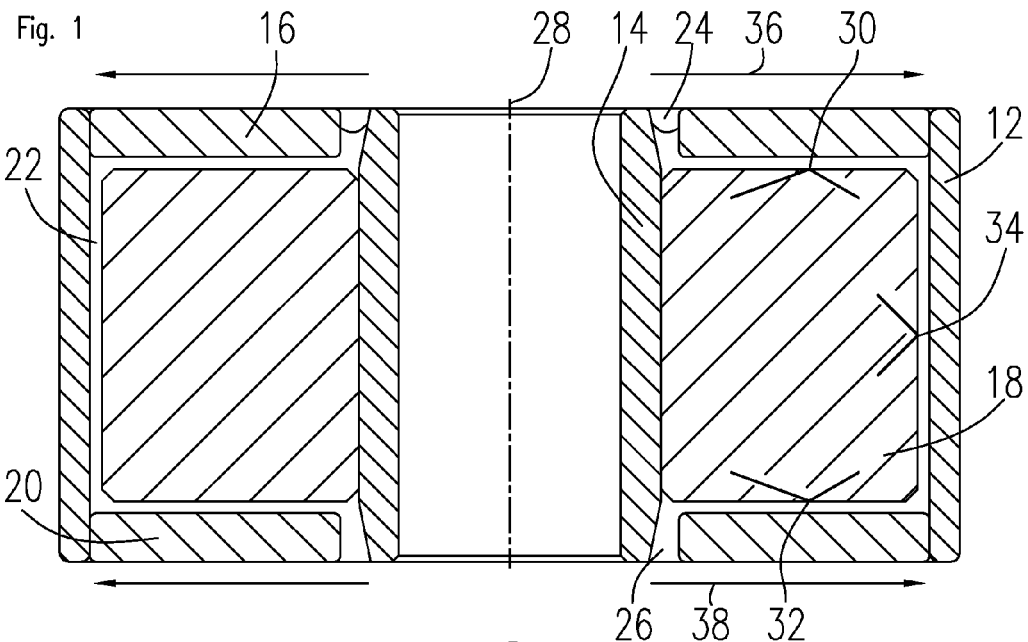
FIG. 1 schematically shows a section through an exemplary embodiment of a fluid dynamic bearing system.

FIG. 1 shows a section through a fluid dynamic bearing that is primarily characterized by its simple construction. The bearing 10 comprises a first bearing ring 12, which here forms the outer boundary of the bearing, and a second bearing ring 14, which here forms the inner boundary of the bearing in the direction of a central bore. The first bearing ring 12, which is substantially cylindrical in shape, is connected to a first annular bearing plate 16 that is disposed at its inside circumference. A third bearing plate 20 is disposed on the first bearing ring 12 at an axial distance to the first bearing plate 16, the third bearing plate 20 again being annular in shape and fixed to the inside circumference of the bearing ring 12. An annular space is formed between the inner surface of the first bearing ring 12 and the inner surfaces of the two bearing plates 16 and 20. The second substantially cylindrical bearing ring 14 is connected at its outside circumference to a second annular bearing plate. The second bearing plate 18 is accommodated in the annular space and, together with the second bearing ring 14, is rotatable about a rotational axis 28 with respect to the first bearing ring 12 and the two bearing plates 16 and 20. A bearing gap 22 filled with a bearing fluid extends between the parts that are rotatable with respect to each other, more precisely, between the facing surfaces of the first bearing plate 16 and the second bearing plate 18, the facing surfaces of the first bearing ring 12 and the second bearing plate 18 as well as the facing surfaces of the third bearing plate 20 and the second bearing plate 18. Sealing zones 24 and 26 are formed at the two open ends of the bearing gap 22, the sealing zones 24, 26 being radially disposed between opposing surfaces of the second bearing ring 14 and the first or the second bearing plate 16 and 20. These sealing zones 24, 26 are designed as tapered capillary seals.

The bearing system comprises two axial bearings 30, 32 and one radial bearing 34 that are marked by bearing patterns which are disposed on one bearing surface, preferably the bearing surface of the second bearing plate 18. The bearing patterns of the axial bearings 30, 32 are designed to be asymmetric, each generating a flow of fluid 36, 38 that is directed in the direction of the interior of the bearing, i.e. in the direction of the radial bearing 34.

Figure 2:
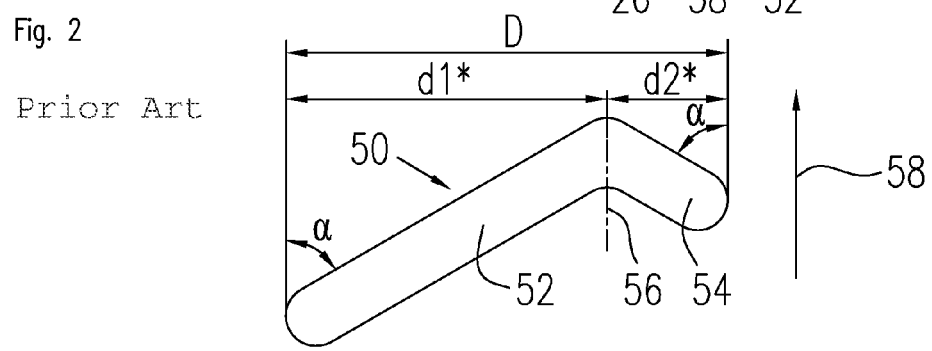
FIG. 2 shows an exemplary bearing pattern according to the prior art.

FIG. 2 shows a bearing pattern according to the prior art which has already been described in the introductory section of the description.

Figure 3A:
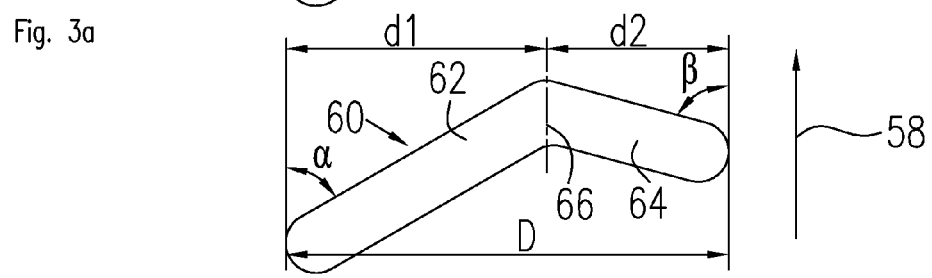
FIG. 3a,b show exemplary bearing patterns according to the invention.

FIG. 3a shows a bearing pattern according to the invention in comparison to the known bearing pattern of FIG. 2. The bearing pattern 60 according to the invention again comprises at least two sections 62, 64 that are connected to each other and merge into one another. In contrast to bearing pattern 50 of FIG. 2, the bearing pattern 60 according to the invention deviates from the well-known form. If, for example, a herringbone pattern is provided, as shown in FIGS. 2 and 3, but the space available or the width D of the available bearing surface is very limited, it may transpire that, due to manufacturing tolerances, a section of the bearing pattern 50 in FIG. 2 is made to be too strong in parts and too weak in other parts so that its effect is likewise too strong at times and to weak at other times. If the pumping effect of the longer section 62 of the bearing pattern 60 is weakened by making the longer section 62 of the pattern 60 shorter than is the case in the prior art, it is then possible to make the shorter section 64 longer, at a constant overall width D of the bearing surface, and thus less susceptible to manufacturing tolerances. To ensure, however, that the pumping effect of the shorter section 64 remains the same compared to section 54, the invention provides for the angle β, which is formed by this section and the direction of movement 58, to be made larger, which goes to reduce the pumping effect of the shorter section 64. Thus, according to the invention provision is made for one section 62 to enclose an angle α with respect to the direction of movement, and the second section 64 an angle β, angle α being distinctly smaller than angle β, for example, $\alpha/\beta <= 3/4$. Because the width d1 taken up by the longer section 62, is now smaller in ratio to the width d2 taken up by the shorter section, the apex line 66 also moves, i.e. the line at which the two sections of the bearing pattern 62 meet. A change in the pumping effect of the sections can further be effected by providing different groove depths, groove shapes, groove widths and of course by changing the number of bearing patterns along the bearing surface.

For example, α lies between 20° and 30° and β between 60° and 80°. The overall width D of the bearing patterns is, for example, approximately between 0.5 mm and 1.0 mm and the width d2 of the shorter section 64 of the bearing patterns 60 is, for example, between 0.1 mm and 0.2 mm when D=0.5 mm and between 0.2 mm and 0.4 mm when D=1.0 mm.

Figure 3B:
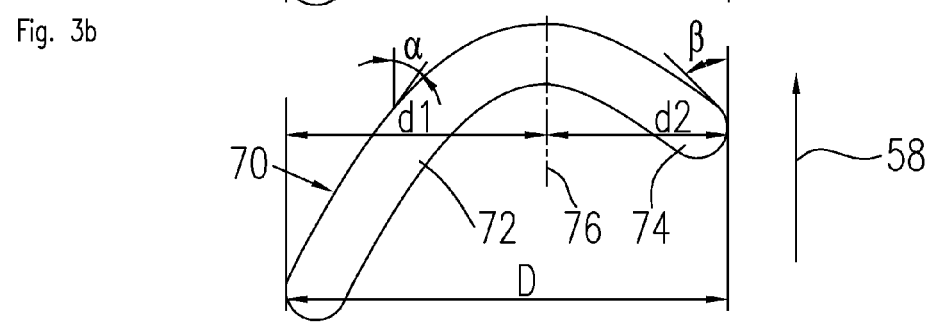

FIG. 3b shows a further bearing pattern 70 according to the invention that differs from that of FIG. 3a by the sinusoidal curvature of the two sections 72, 74, which extend on each side of the apex line 76. Each section has a different curvature and length and they also enclose different angles α, β at the height of the shorter section 74.

Figure 4:
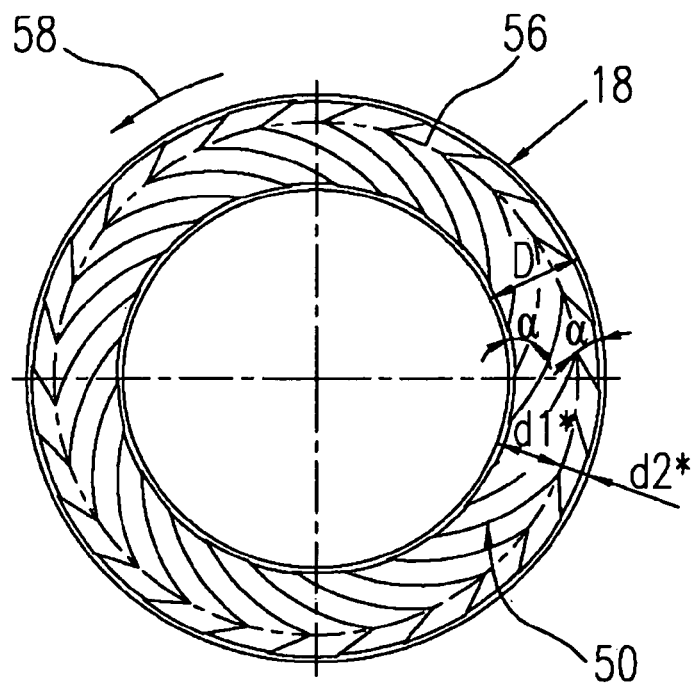
FIG. 4 shows an exemplary top view of the bearing disk 18 in FIG. 1 provided with bearing patterns according to the prior art.

FIG. 4 shows a top view of the middle bearing disk 18 of the fluid bearing according to FIG. 1, axial bearing patterns 50 according to the prior art being formed on a bearing surface having diameter D. It can be seen that the apex line 56 is very close to the outside rim of the bearing surface, so that the short sections of the bearing patterns 50 are extremely short compared to the long sections, and their effectiveness depends very greatly on manufacturing precision.

Figure 5:
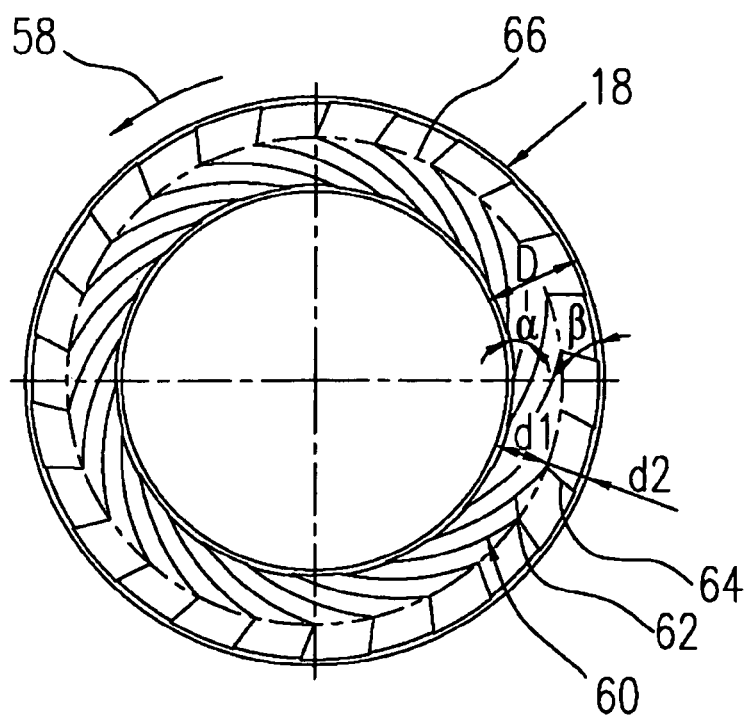
FIG. 5 shows a top view of a bearing disk 18 from FIG. 1 provided with bearing patterns according to the invention.

FIG. 5 now shows the bearing surface of the bearing disk 18 having the axial bearing patterns 60 according to the invention, that, for one thing, are disposed at different angles α and β, the differing angles making it possible to lengthen the short sections 64 of the bearing patterns 60, so that manufacturing precision has less influence on the effectiveness of these short sections of the bearing patterns 60.

Figure 6:
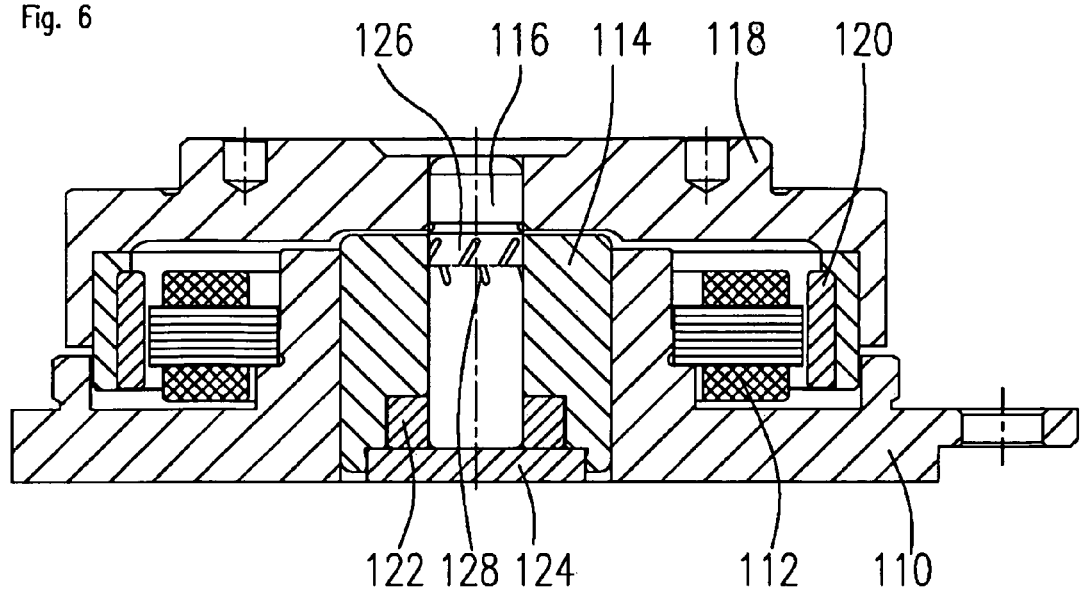
FIG. 6 shows a section through an exemplary embodiment of a spindle motor having a fluid dynamic bearing system.
Figure 7:
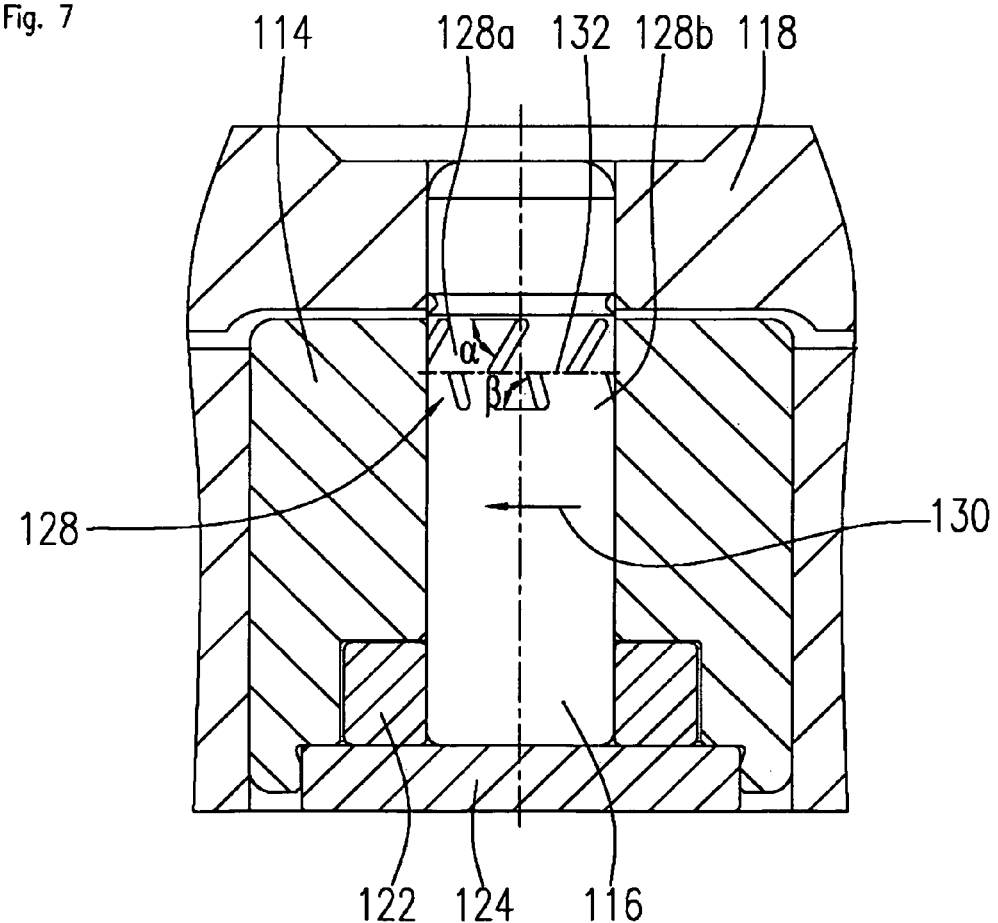
FIG. 7 shows an enlargement of the spindle motor from FIG. 6, particularly the region of the bearing system.

Bearing patterns for a radial bearing according to the invention are shown in FIGS. 6 and 7.

The spindle motor according to FIG. 6 comprises a stationary baseplate 110 on which a stator arrangement 112, consisting of a stator core and windings and forming part of an electromagnetic drive system, is disposed. A bearing bush 114 is held in a recess in the baseplate 110 and has an axial cylindrical bore in which a shaft 116 is rotatably accommodated. The free end of the shaft 116 carries a rotor 118 on which one or more storage disks (not illustrated) of a hard disk drive can be disposed and fixed. An annular permanent magnet 120 having a plurality of pole pairs is disposed at the lower inside edge of the rotor 118, an alternating electric field being applied to the pole pairs via a stator arrangement 112 spaced apart from them by means of an air gap, so that the rotor 118 together with the shaft 116 is set in rotation. The shaft 116, together with a thrust plate 122 and the bearing bush 114, forms a hydrodynamic bearing arrangement whose functioning will not be described in more detail here. The bearing arrangement is sealed from below by a cover plate 124. In a well-known manner, the bearing comprises at least one radial bearing 126 that is marked by a plurality of bearing patterns 128 disposed on the surface of the shaft 116 and/or on the surface of the bearing bush 114.

FIG. 7 shows an enlarged view of the bearing system of the spindle motor of FIG. 6. An upper radial bearing is provided, for example, with bearing patterns 128 according to the invention, which consist of two sections 128a and 128b that are not connected to each other and are disposed at an offset to each other with respect to the direction of movement 130 of the bearing parts 114, 116. The two sections 128a and 128b of the bearing pattern 128 meet at an apex line 132, the longer section 128a of the bearing pattern 128 enclosing an angle α with an imaginary line to the direction of movement and the shorter section 128b of the bearing pattern 128 enclosing an angle β with an imaginary line parallel to the direction of movement 130.

Angle α could, for example, be 20 to 30°, particularly 24° and angle β could, for example, be 60 to 80°, particularly 70°.

Identification Reference List
10 Bearing system
12 First bearing ring
14 Second bearing ring
16 First bearing plate
18 Second bearing plate
20 Third bearing plate
22 Bearing gap
24 Sealing gap
26 Sealing gap
28 Rotational axis
30 Axial bearing
32 Axial bearing
34 Radial bearing
36 Flow of fluid
38 Flow of fluid
50 Bearing pattern
52 Section (long)
54 Section (short)
56 Apex line
58 Direction of movement
60 Bearing pattern
62 Section (long)
64 Section (short)
66 Apex line (direction of movement)
70 Bearing pattern
72 Section (long)
74 Section (short)
76 Apex line (direction of movement)
110 Baseplate
112 Stator arrangement
114 Bearing bush
116 Shaft
118 Rotor
120 Permanent magnet
122 Thrust plate
124 Cover plate
126 Radial bearing
128 Bearing pattern
128a Section
128b Section
130 Direction of movement
132 Apex line

The invention claimed is:

1. A fluid dynamic bearing pattern (60; 70; 128) that is disposed on at least one bearing surface of a fluid dynamic bearing (10; 126) comprising at least two bearing parts (12, 16, 18, 20; 114, 116) moveable with respect to each other along a direction of movement (58; 130), wherein the bearing pattern (60; 70; 128) comprises two related grooved sections (62, 64; 72, 74; 128a, 128b), wherein each section (62, 64; 72, 74; 128a, 128b) extends at an acute angle with respect to the direction of movement (58; 130) and exerts a defined pumping effect on the bearing fluid found in the bearing when the bearing parts move with respect to one another,
characterized in that the first section (62; 72; 128b) is disposed at an angle α and the second section (64; 74; 128a) at an angle β with respect to the direction of movement, where α<β,
wherein the first section is arranged adjacent to an open end of a bearing gap formed between the two bearing parts, and the second section is arranged towards an interior of the bearing,
and wherein the groove depth of the first section is different from the groove depth of the second section.

2. A fluid dynamic bearing pattern according to claim 1, characterized in that the bearing pattern (60; 70; 128) is designed to be asymmetric.

3. A fluid dynamic bearing pattern according to claim 1, characterized in that the ratio of the angles is α/β≦3/4.

4. A fluid dynamic bearing pattern according to claim 1, characterized in that the sections (62, 64; 72, 74) of the bearing pattern (60; 70) merge into one another at a point.

5. A fluid dynamic bearing pattern according to claim 1, characterized in that the sections (128a, 128b) of the bearing pattern (128) are separated from one another by a small gap.

6. A fluid dynamic bearing pattern according to claim 1, characterized in that the sections (62, 64; 128a, 128b) form an angle to each other of 20° to 160°.

7. A fluid dynamic bearing pattern according to claim 1, characterized in that at least one section (62, 64) is formed as a straight line.

8. A fluid dynamic bearing pattern according to claim 1, characterized in that at least one section (128*a*, 128*b*) is formed as a curve.

9. A fluid dynamic bearing pattern according to claim 8, characterized in that the curvatures of the two sections (128*a*, 128*b*) differ from one another.

10. A fluid dynamic bearing pattern according to claim 1, characterized in that the two sections (62, 64; 128*a*, 128*b*) have different lengths.

11. A fluid dynamic bearing pattern according to claim 1, characterized in that the at least one bearing surface is an axial bearing surface.

12. A fluid dynamic bearing pattern according to claim 1, characterized in that the bearing pattern (60; 70; 128) is disposed in a periodically repeating pattern along the direction of movement (58; 130) and that the ratio of the groove width of the sections (62, 64; 72, 74; 128*a*, 128*b*) to the period length varies.

13. A fluid dynamic bearing (10; 126) having at least two bearing parts that are moveable with respect to each other along a direction of movement (16, 18, 20; 114, 116) and that form a bearing gap (22) filled with a bearing fluid between associated bearing surfaces, a plurality of bearing patterns (60; 128) according to claim 1 being disposed on at least one bearing surface.

14. A spindle motor having a fluid dynamic bearing according to claim 13 and an electromagnetic drive system (112, 120) for driving one bearing part (116, 118) in rotation with respect to the other bearing part (114).

15. A fluid dynamic bearing pattern according to claim 1, characterized in that the groove width of the first section is different from the groove width of the second section.

16. A fluid dynamic bearing pattern (60; 70; 128) that is disposed on at least one bearing surface of a fluid dynamic bearing (10; 126) comprising at least two bearing parts (12, 16, 18, 20; 114, 116) moveable with respect to each other along a direction of movement (58; 130), wherein the bearing surface has a width D, and the bearing pattern (60; 70; 128) comprises two related grooved sections (62, 64; 72, 74; 128*a*, 128*b*), wherein each section (62, 64; 72, 74; 128*a*, 128*b*) extends at an acute angle with respect to the direction of movement (58; 130) and exerts a defined pumping effect on the bearing fluid found in the bearing when the bearing parts move with respect to one another, characterized in that the first section (62; 72; 128*b*) has a width dl and is disposed at an angle $\alpha$ with respect to the direction of movement, and the second section (64; 74; 128*a*) has a width d2 and is disposed at an angle $\beta$ with respect to the direction of movement, where a $\alpha<\beta$, wherein the first section is arranged adjacent to an open end of a bearing gap formed between the two bearing parts, and the second section is arranged between the first section and a second end of the bearing gap, and wherein dl >d2, so that the asymmetric bearing pattern generates a flow of bearing fluid toward an interior of the bearing.

* * * * *